US008868554B1

(12) United States Patent
Acton et al.

(10) Patent No.: US 8,868,554 B1
(45) Date of Patent: Oct. 21, 2014

(54) ASSOCIATING PRODUCT OFFERINGS WITH PRODUCT ABSTRACTIONS

(75) Inventors: Brian Acton, Saratoga, CA (US); Brian Stolte, San Francisco, CA (US); Rob Solomon, Menlo Park, CA (US); Jeff Weiner, Palo Alto, CA (US); Catherine Cadogan, Santa Clara, CA (US); Matt Heist, San Carlos, CA (US); Manish Baldua, San Jose, CA (US); Charles Arendt, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 471 days.

(21) Appl. No.: 10/788,537

(22) Filed: Feb. 26, 2004

(51) Int. Cl.
*G06F 17/30* (2006.01)

(52) U.S. Cl.
USPC .......................................... 707/736; 705/26.1

(58) Field of Classification Search
USPC ............... 707/3, 5, 7, 736; 715/530; 705/26.1
See application file for complete search history.

(56) References Cited

U.S. PATENT DOCUMENTS

| | | | |
|---|---|---|---|
| 6,064,980 A * | 5/2000 | Jacobi et al. ................. | 705/26.7 |
| 6,412,012 B1 * | 6/2002 | Bieganski et al. ............ | 709/232 |
| 6,438,543 B1 * | 8/2002 | Kazi et al. .......................... | 707/5 |
| 6,578,030 B1 | 6/2003 | Wilmsen et al. | |
| 6,697,799 B1 | 2/2004 | Neal et al. | |
| 6,728,752 B1 | 4/2004 | Chen et al. | |
| 6,751,600 B1 | 6/2004 | Wolin | |
| 6,785,671 B1 * | 8/2004 | Bailey et al. ...................... | 705/5 |
| 6,910,044 B2 | 6/2005 | Weinberg et al. | |
| 7,082,426 B2 * | 7/2006 | Musgrove et al. .............. | 707/3 |
| 7,086,002 B2 * | 8/2006 | Elo et al. ........................ | 715/234 |
| 7,319,971 B2 * | 1/2008 | Abrahams et al. ........... | 705/7.28 |
| 8,051,105 B1 | 11/2011 | Johnson | |
| 2001/0044758 A1 | 11/2001 | Talib et al. | |
| 2002/0055903 A1 | 5/2002 | Solomon | |
| 2002/0062258 A1 | 5/2002 | Bailey et al. | |
| 2003/0120662 A1 | 6/2003 | Vishik | |
| 2003/0149675 A1 | 8/2003 | Ansari et al. | |
| 2004/0015408 A1 | 1/2004 | Rauen et al. | |
| 2004/0193591 A1 | 9/2004 | Winter | |
| 2005/0149390 A1 | 7/2005 | Scholl et al. | |
| 2006/0064411 A1 | 3/2006 | Gross et al. | |
| 2006/0095270 A1 | 5/2006 | Somerville | |
| 2006/0184430 A1 | 8/2006 | Gavarini | |

(Continued)

OTHER PUBLICATIONS

David D. Lewis. "Naive (Bayes) at forty: The independence assumption in information retrieval". In Claire N'edellec and C'eline Rouveirol, editors, Proceedings of ECML-98, 10th European Conference on Machine Learning, No. 1398, pp. 4-15, Chemnitz, DE, 1998. Springer Verlag, Heidelberg, DE.

(Continued)

*Primary Examiner* — Cam-Linh Nguyen
*Assistant Examiner* — Chelcie Daye
(74) *Attorney, Agent, or Firm* — Hickman Palermo Truong Becker Bingham Wong LLP

(57) ABSTRACT

Techniques are provided for associating product offerings with product abstractions. The techniques enable generating a second product offering based on a first product offering by mapping items in the first product offering using one or more mapping dictionaries, where a product offering is an offer to sell a particular product by a particular party. Once the second product offering has been generated, a matching score is determined for each of one or more product abstractions; and then one or more product abstractions are associated with the first product offering based on the matching scores for the second product offering.

30 Claims, 6 Drawing Sheets

(56) References Cited

U.S. PATENT DOCUMENTS

2006/0282339 A1  12/2006  Musgrove et al.
2007/0022021 A1   1/2007  Walker et al.
2008/0313247 A1  12/2008  Galvin
2010/0057806 A1   3/2010  Neal et al.

OTHER PUBLICATIONS

U.S. Appl. No. 10/789,837, Final Office Action, mailed Apr. 15, 2008, 18 pages.

State Intellectual Property Office of China, Notice of Registration in application No. 200580037229.1, dated Dec. 20, 2011, 5 pages.

Current Claims in Application No. 200580037229.1, dated Dec. 2011, 4 pages.

Xue, G. et al., "Implicit Link Analysis for Small Web Search", Proceedings of the 26th annual international ACM SIGIR conference on Research and development in information retrieval (2003) (8 pages).

U.S. Appl. No. 10/920,588, filed Aug. 17, 2004, Notice of allowance, mailed Sep. 2, 2010.

U.S. Appl. No. 11/373,726, filed Sep. 8, 2010, Notice of allowance.

U.S. Appl. No. 11/769,641, filed Jun. 27, 2007, Notice of allowance, mailed Jun. 28, 2012.

* cited by examiner

ASSOCIATING PRODUCT OFFERINGS WITH PRODUCT ABSTRACTIONS

RELATED APPLICATIONS AND PRIORITY CLAIM

This patent application is related to U.S. patent application Ser. No. 10/789,837, filed on Feb. 26, 2004, entitled "Product Data Classification" naming Brian Acton, Brian Stolte, Rob Solomon, Jeff Weiner, Catherine Cadogan, Matt Heist, Manish Baldua, and Charles Arendt as inventors, the entire contents of these prior applications are hereby incorporated by reference in their entirety for all purposes.

This patent application is related to U.S. patent application Ser. No. 10/789,839, filed on Feb. 26, 2004, entitled "Scoring Mechanism Selection Along Multiple Dimensions" naming Brian Acton, Brian Stolte, Rob Solomon, Jeff Weiner, Catherine Cadogan, Matt Heist, Manish Baldua, and Charles Arendt as inventors, the entire contents of these prior applications are hereby incorporated by reference in their entirety for all purposes.

FIELD OF THE INVENTION

The present invention relates to product data classification. The invention specifically relates to associating product offerings with product abstractions.

BACKGROUND OF THE INVENTION

It is becoming increasingly common for shoppers to search for the particular product in which they are interested using electronic search mechanisms, such as Internet-based search engines. The complex systems used by such electronic search mechanisms to process incoming product data from multiple merchants and deliver that product data in the form of search results to millions of customers must ensure that customers receive the best information available. In order to do this, product offering information, data that represents an offer to sell a particular product by a particular party, must be obtained from multiple sources and stored in a way that allows the product offerings to be easily searched.

One approach to storing such information is to place all data, such as electronic product offering data, in a database. A problem with the approach is that it does not take advantage of interrelationships among product offerings. For example, using this approach, two product offerings, each from a different merchant and each for a copy of Fitzgerald's "The Great Gatsby", would be unassociated in the database. In such a case, the electronic search mechanism, during a search for books with the word "Gatsby", would have to find each of the product offerings separately. A problem with this approach is that finding multiple product offerings for the same product separately uses extra time and processing power.

An improvement to the approach discussed above is to use product abstractions—abstract representations of products—to group product offerings. In the approach, product offerings are associated with product abstractions, which may aid a search mechanism by allowing the search mechanism to search product abstractions in addition to or instead of product offerings. In this approach, a search mechanism may find product abstractions that match queries and, from the mapping between each product abstraction and its corresponding product offerings, find the matching product offerings, thereby simplifying searching. For example, if two product offerings from two merchants, each for a copy of Fitzgerald's "The Great Gatsby" were each associated with a Gatsby product abstraction (a product abstraction representing copies of Fitzgerald's "The Great Gatsby"), then, using this approach, an electronic search mechanism in searching for copies of "The Great Gatsby" would find the Gatsby product abstraction and, given the mapping between each of the product offerings and the product abstraction, the two product abstractions. This saves on the time and operational cost of processing queries.

In order to implement an approach using product abstractions, techniques are needed for mapping product offerings to product abstractions. One approach to mapping product offerings to product abstractions is to do data field matching between data in the product offering and data in the product abstraction. This may be accomplished using a database query. For example, a mapping from a product offering of Fitzgerald's "The Great Gatsby" to a product abstraction may be performed by querying a database for a product abstraction that has "Fitzgerald" as the author and "The Great Gatsby" as the book title. A problem with this approach, however, is that data must match exactly between the product offering and the product abstraction. For example, consider a product offering for a book with "The Great Getsby" (note the "e" replacing the "a" in the word "Getsby") as the title and "Fitzgerald" as the author and a product abstraction with "The Great Gatsby" as the title and "Fitzgerald" as the author. Since both the title and author must match, this product offering would not be mapped to this product abstraction, even though, in essence, they each refer to the same book by the same author. If, in using this approach, the restriction was relaxed and, for example, only one of the two terms needed to match from the product offering to a product abstraction with "The Great Gatsby" as title and "F. Scott Fitzgerald" as the author. In this case, product offerings for "The Great Gatsby" Cliff Notes by Karen Maurer and "Tender is the Night" by F. Scott Fitzgerald would both be erroneously mapped to the product abstraction for "The Great Gatsby" by F. Scott Fitzgerald product abstraction. Approaching the problem in this way causes a lack in specificity.

Therefore, based on the foregoing, it is clearly desirable to provide a method for associating product offerings with product abstractions that does not have the problems of requiring exact textual matching of data, but still preserves the specificity necessary to appropriately map product offerings to product abstractions.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
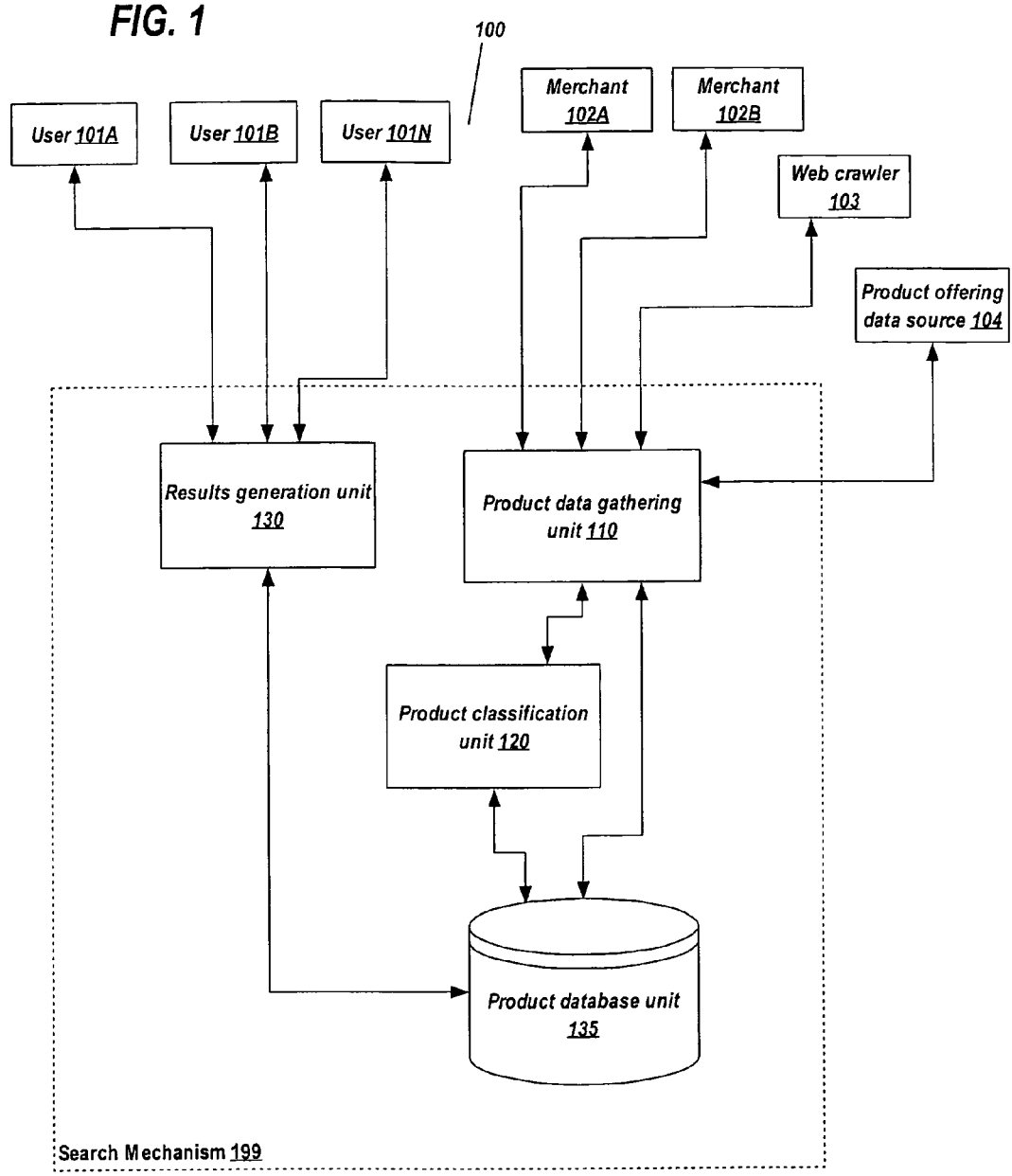
FIG. 1 is a block diagram of a search mechanism according to one embodiment of the invention.

A method and apparatus for associating data with product abstractions is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

As mentioned above, one problem encountered by Internet-based search mechanisms is the ability to accurately map product offerings to product abstractions. Techniques are described herein for generating canonical product offering data based on a first product offering. The techniques for generating canonical product offering data include (1) searching in the first product offering for items (e.g. tokens, words, symbols, whitespace, phrases, etc.) within the product offering that may be mapped to alternate forms, (2) choosing mapping dictionaries based on the items from the first product offering, (3) looking up the items in the mapping dictionaries, and (4) generating the canonical product offering data based on the first product offering and the alternate forms of items from first product offering obtained from the mapping dictionaries. There are numerous types of mapping dictionaries described below.

The canonical product offering data may include less than the number of items contained in the first product offering. For example, some of the items from the first product offering might not be included, either directly or via a representative item from a mapping dictionary, in the canonical product offering data.

After generating the canonical product offering data, a matching score is determined for each of one or more product abstractions and the scores are used to determine the product abstraction to which the first product offering will be mapped.

Once the mappings between product offerings and product abstractions are completed, the search mechanism may use these mappings to more efficiently process queries received from the users of the search mechanism.

Various novel techniques are described herein for associating product offerings with product abstractions. For the sake of clear understanding, an example embodiment is described below. Specifics and possible alternatives are given as part of the example embodiment. These specific details in no way limit the invention that is described fully by the claims, but instead provide illustrations intended to aid understanding.

Product Abstractions

A product abstraction is an abstract electronic representation of a product or a set of products. In many cases a product abstraction is one or more records in a database or information in a flat file stored in XML, HTML, character-delimited, or any other appropriate format. In the example given below, a product abstraction is a record in a product database. The data contained in a product abstraction includes one or more fields that describe the product. For example, a product abstraction of a laptop may be a row in a database containing the central processing unit (CPU) speed, the hard drive capacity, the screen size, and a description of the network card.

In many cases, a product abstraction will map to multiple product offerings for the same product, such as ten paperback copies of Fitzgerald's "The Great Gatsby". In other cases, a product abstraction will map to multiple product offerings for similar products, such as one new paperback copy of Fitzgerald's "The Great Gatsby", one new hardback copy of Fitzgerald's "The Great Gatsby", and one autographed copy of Fitzgerald's "The Great Gatsby".

System Overview

FIG. 1 is a block diagram of a search mechanism according to one embodiment of the invention. Techniques are described hereafter for associating product offerings with product abstractions. These techniques enable a broader system which may include, but neither must include nor is limited to the following components:

one or more users 101A, 101B, 101N that submit queries to the results generation engine 130 and receive results based on those queries;

one or more merchants 102A, 102B that submit or make available product offering data to the product offering data gathering unit 110;

one or more web crawlers 103 which collect product offering data which is made available to the product offering data gathering unit 110;

one or more product offering data sources 104, which are any electronic sources of product offering data for the product offering data gathering unit 110; and a search mechanism 199 comprising:
   a product offering data gathering unit 110 for bringing data into the system;
   a product classification unit 120 for associating product offerings with product categories and product abstractions;
   a product database unit 135 for storing information related to product offerings, merchants, product categories, product abstractions and the mappings among them; and
   a results generation engine 130 for producing results based on user queries and items in the product database unit 135.

The various components of the search mechanism 199, including the product offering data gathering unit 110, the product classification unit 120, the results generation engine 130, and the product database unit 135 are described below.

Product Gathering Unit

The product offering data gathering unit 110 obtains data, corresponding to one or more product offerings, from one or more merchants 102A, 102B, one or more web crawlers 103, and any other appropriate product offering data source 104.

The product offering data gathering unit 110 may obtain data from these sources using any of a number of protocols, including file transfer protocol (FTP), rsync, hypertext transfer protocol (HTTP), secure HTTP (HTTPS), and TCP/IP (transaction control protocol/Internet protocol) sockets. Product offering data may also be provided to the product offering data gathering unit 110 via a machine-readable medium, such as a compact disk (CD). In a related scenario, the product offering data gathering unit 110 may read the product offering data directly from the CD or machine-readable medium. The product offering data on the machine-readable media may be, for example, a product catalog. The product offering data may be in any of a number of formats including hypertext markup language (HTML), extensible markup language (XML), electronic data interchange (EDI), and character-delimited formats. Additionally, a web crawler 103 may collect product offering data from one or more web sites and the product data gathering unit 110 may obtain product data from the web crawler 103 over a network or via a machine-readable medium.

Each of merchants 102A, 102B generally represents a person or company offering to sell a product. To interact with the product offering data gathering unit 110, a merchant 102A may, for example, upload data associated with a product offering to a website associated with the product offering data gathering unit 110 via HTTP. A web crawler 103 is a set of one or more processes working in concert to gather web page information from the Internet, a private Intranet, or any other electronic collection of web pages. Other product offering data sources 104 may be any electronic source of product offering data for the product offering data gathering unit 110. An example product offering data source 104 may be an electronic version of a product catalog provided to the product offering data gathering unit 110 on a compact disk (CD).

Product Classification Unit

The product classification unit 120 is communicatively coupled to both the product offering data gathering unit 110 and the product database unit 135. The product database unit 135 is also communicatively coupled to the results generation engine 130. In the illustrated embodiment, each of these units 110, 120, 130, 135 runs on a separate computer. In alternative embodiments, one or more of these units may be implemented to run as separate processes running on the same computer; one or more units may be implemented to each run on multiple processors; multiple units may be implemented to run within a single process; or all entities in the search mechanism 199 may be implemented as a single process.

The functioning of the product classification unit 120 is described in more detail below. In general, however, the product classification unit 120 matches product offering data obtained by the product offering data gathering unit 110 to one or more of:

(1) product categories, which are groupings of one or more items, where those items include (a) more product categories, (b) product abstractions, (c) more product offerings, and (d) merchants; and (2) product abstractions, which are abstract electronic representations of a product or set of products.

The product classification unit 120 stores data associated with the incoming product offering data and the classifications of the product offering data to the product database unit 135. In the illustrated embodiment, the product database unit 135 is a relational database. In alternative embodiments, the product database unit 135 may be a flat file a Lightweight Directory Access Protocol (LDAP) directory, or another appropriate storage mechanism.

Mapping Dictionary

A mapping dictionary is a machine-readable medium that bears a set of items and equivalency interrelationships among those items. For example, a symbol mapping dictionary has a set of symbol items such as ",", ":", ";", and ".". Depending on the needs of the product classification unit 120 and the data received at the product data gathering unit 110, the equivalency relationship among these symbol items may vary. For example, when inputting files that are known to be fields of data that are symbol-delimited, symbol mapping dictionary would contain all of the symbol items ",", ":", ";", and "." and mapping information indicating that all of these symbol items are equivalent.

A mapping dictionary may also contain information as to a preferred or canonical representative of a group of interrelated symbols. For example, in the symbol dictionary described above, "," may be assigned to be the representative symbol item for symbol items ",", ":", ";", and ".". As will be described below this representative or canonical item is used to aid matching of product offerings to product abstractions.

A mapping dictionary is typically stored as a data structure in memory or as a set of records in a database. In the example herein, each mapping dictionary is implemented as a set of queryable tables in product database unit 135. The method of storage and retrieval of the mapping dictionary, however, is not critical to the techniques described herein.

Any appropriate mapping dictionary may be used in this system. Some example mapping dictionaries are described herein, including a brand name mapping dictionary, a thesaurus mapping dictionary, a proper noun mapping dictionary, a spell checking mapping dictionary, a symbol mapping dictionary, and a whitespace characters mapping dictionary.

A brand name mapping dictionary maps the relationship among one or more brand names. For example, multiple brands names may represent a single brand or a single company, and in some of those cases, these brand names may be normalized to a single representative brand name. For example, "Penguin Classics"™ is a series of books published by "Penguin"™ publishing company. Consider the case where a product offering erroneously specifies "Penguin Classics"™ as the publisher and the brand name mapping dictionary contains mapping information indicating "Penguin"™ as the representative item for item "Penguin Classics"™. The techniques described herein would effectively correct the "Penguin Classics"™ error and thereby improve the chance of correctly mapping the product offering containing the error to appropriate product abstractions.

A thesaurus mapping dictionary maps the relationship among one or more text strings. For example, multiple words may have similar meaning and may be representable by a single, representative text string. For example, the word "irregardless" is occasionally used in place of "regardless". Consider the case where a product offering uses the word "irregardless" and the thesaurus mapping dictionary contains mapping information indicating "regardless" as the representative item for item "irregardless". The techniques described herein would effectively correct the "irregardless" error and thereby improve the chance of correctly mapping the product offering containing the error to appropriate product abstractions.

A proper noun mapping dictionary maps the relationship among one or more text strings. For example, multiple words may have similar meaning and may be representable by a single, representative text string. For example, the string containing the author's name "Joanne Kathleen Rowling" is occasionally used in place of "J. K. Rowling". Consider the case where a product offering uses "Joanne Kathleen Rowling" and the proper noun mapping dictionary contains mapping information indicating "J. K. Rowling" as the representative item for item "Joanne Kathleen Rowling". The techniques described herein would effectively correct the "Joanne Kathleen Rowling" error and thereby improve the chance of correctly mapping the product offering containing the error to appropriate product abstractions.

A spell checking mapping dictionary maps the relationship among one or more text strings. For example, multiple words may have similar meaning and may be representable by a single, representative text string. For example, the word "hte" is occasionally used in place of "the". Consider the case where a product offering uses the word "hte" and the spell checking mapping dictionary contains mapping information indicating "the" as the representative item for item "hte". The techniques described herein would effectively correct the "hte" error and thereby improve the chance of correctly mapping the product offering containing the error to appropriate product abstractions.

A symbol mapping dictionary maps the relationship among one or more symbols. For example, multiple symbols may be used erroneously in product offerings or may be representable by a single, representative whitespace character or set of whitespace characters. For example, consider the case where a product offering uses the symbol "/" to separate fields of data in a product offering, the product classification unit 120 is expecting ";" to separate fields, and the symbol mapping dictionary contains mapping information indicating ";" as the representative item for item "/". The techniques described herein would effectively correct the "/" error and thereby improve the chance of correctly mapping the product offering containing the error to appropriate product abstractions.

A whitespace mapping dictionary maps the relationship among one or more strings of whitespace. Whitespace is any character visually represented as space in a text. Whitespace may include spaces, tabs, carriage returns, paragraph breaks, etc. Multiple types of whitespace may be uses interchangeably in product offerings or may be representable by a single, representative symbol or set of symbols. For example, in a case where a product offering used spaces or paragraph breaks to separate fields of data in a product offering, the product classification unit 120 is expecting tabs to separate fields, and the symbol mapping dictionary contains mapping information indicating tabs as the representative item for item spaces and paragraph breaks, the techniques described herein would effectively correct the spaces and paragraph breaks error and thereby improve the chance of correctly mapping the product offering containing the error to appropriate product abstractions.

Any appropriate method of populating a mapping dictionary may be used. Example methods of populating a mapping dictionary include loading data into the mapping dictionary from a spell checking dictionary, manually entering items and relationships into the database, and automatically populating the mapping dictionary with items determined to be equivalent. Items may be determined to be equivalent using, for example, a Bayesian classifier to match items between a product offering and a product abstraction. For example, in constructing a mapping dictionary an input product offering "Title: "The Great Getsby"; Author: Fitzgerald" may be determined to be equivalent to a product offering "Title: "The Great Gatsby"; Author: Fitzgerald" giving the similarity between the product offering and product abstraction. Based on the equivalence determined, the item "Gatsby" would be assigned as the representative item for "Getsby" in the mapping dictionary.

Results Generation Unit

The functioning of the results generation unit 130 is described in more detail below. In general, however, it produces results for users 101A, 101B, 101N based on queries from the users 101A, 101B, 101N, and based on the data and mappings in the product database unit 135. The users 101A, 101B, 101N may be human operators or automated processes. These users 101A, 101B, 101N may communicate with the results generation unit 130 via HTTP, XML, HTTPS, FTP, rsync, or TCP/IP sockets, or any other appropriate communication mechanism in any appropriate format (XML, HTML, etc.). For example, a human user 101A submits a search query in HTML to a website associated with a results generation engine 130, which processes the query and produces results based on data and links in the product database unit 135 and returns results to the user in XML.

Functional Overview

Finding Matching Product Abstractions

One of the operations of the embodiment described above is having the product classification unit 120 find matching product abstractions for product offerings received by the product data gathering unit 110. The process of finding matching product abstractions for product offerings is described by FIG. 2 and the use of this product offering to product abstraction mapping is described in FIG. 3.

Figure 2:
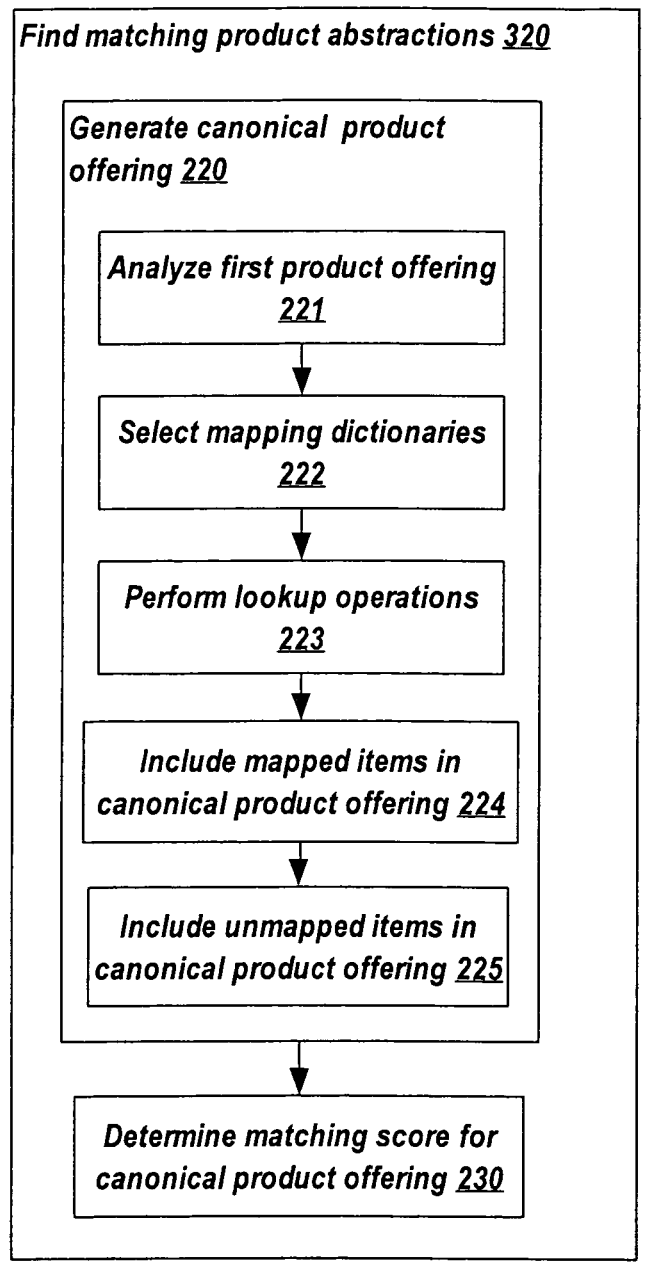
FIG. 2 is a flow diagram that illustrates a process for finding matching product abstractions for product offerings.

FIG. 2 is a flow diagram that illustrates a process for finding matching product abstractions for product offerings.

Figure 3:
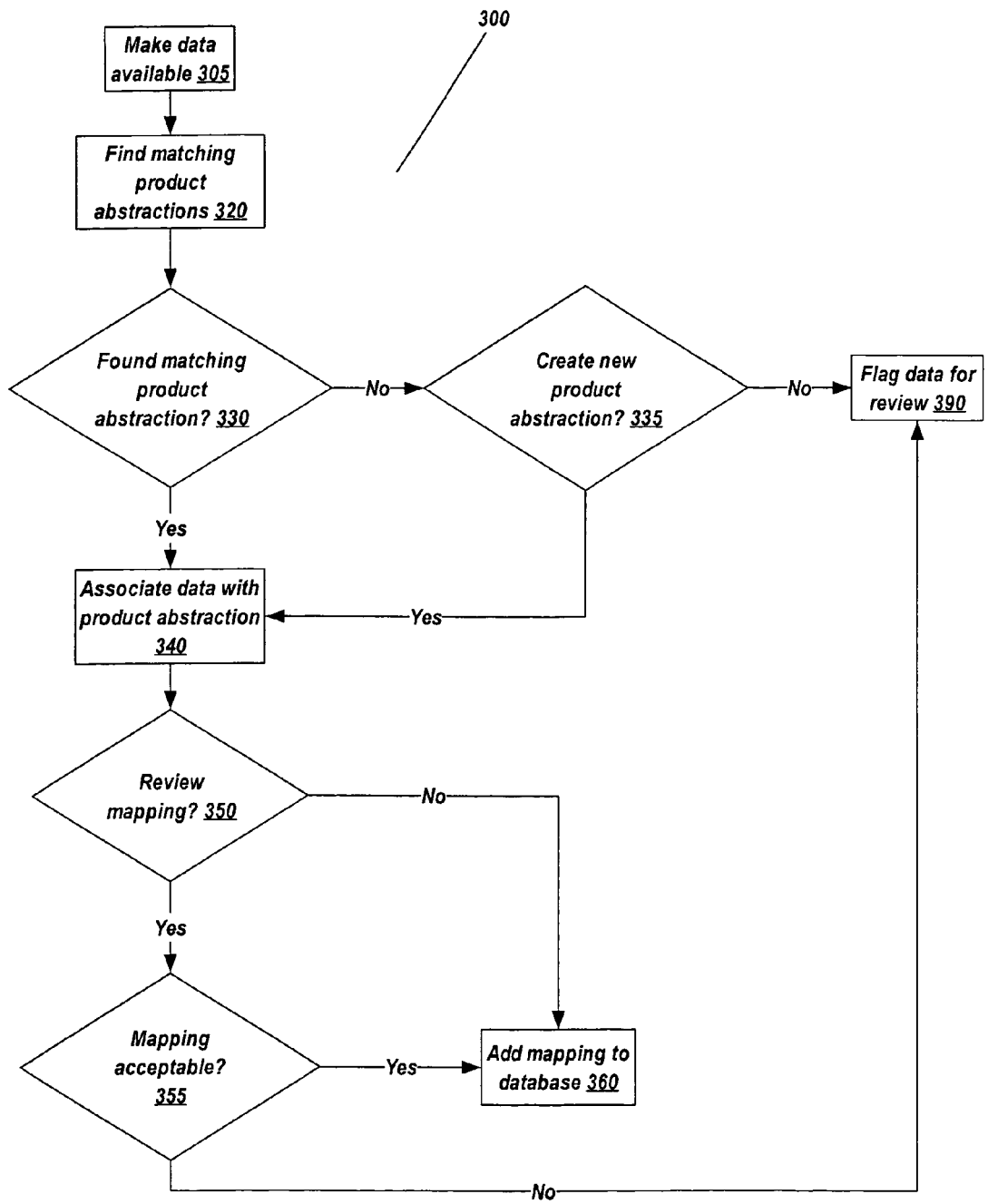
FIG. 3 is a flow diagram that illustrates a process for associating data with a product abstraction.

The process of finding a matching product abstraction is herein called step 320 and is referred to in FIG. 3. Step 320 comprises generating a canonical product offering from a first product offering, step 220, and determining a matching score for the canonical product offering, step 230.

The step 220 of generating the canonical product offering is performed by first analyzing the first product offering in step 221. This is done by parsing the machine-readable medium containing the first product offering and from that determining the items in the first product offering. For example, the items in a product offering containing the string "Title: "The Great Getsby"; Author: Fitzgerald" may include "Title", ":", " ", "The", etc. The decision as to what is considered an item is dictated by the needs of the techniques here and may include whitespace, symbols, text words, and text strings. For examples, in some embodiments of the techniques described herein "The Great Getsby" would be considered a single item, in other embodiments "The Great Gatsby" would be split into three items: "The", "Great", and "Getsby", and in yet other embodiments, "The Great Getsby", "The", "Great", and "Getsby" would all be considered items.

The items are stored in a machine-readable medium communicatively coupled to the product classification unit 120. The items may be stored in a data structure in memory, in a database as records, or in any other appropriate structure, format, and machine-readable medium.

After analyzing the first product offering in step 221, mapping dictionaries are selected for use in step 222. In this example, the choice of mapping dictionary is made on a per-item basis. For example, a symbol mapping dictionary would be selected for use in mapping the token ":". A lookup for each item may also be performed in every mapping dictionary or in a subset of the mapping dictionaries. For example, both a proper name mapping dictionary and a spell checking mapping dictionary would be selected for use for the item "Getsby". In addition, multiple mapping dictionaries may be used in any order. For example, for the item "Getsby" a spell checking mapping dictionary would be selected for use first, and then a proper name mapping dictionary.

The process of selecting which mapping dictionaries to use for particular items may be performed in any number of ways. For example, heuristics or rules may be used. For example, all capitalized text items may have selected for use a proper name mapping dictionary. Additionally, each item may be compared to a list of items known to be in the mapping dictionary. For example, the symbol item ":" may be compared to a list of symbol items known to be in the symbol mapping dictionary. In some cases, no mapping dictionary is selected for a particular item, e.g. if the item is in a list of items that should not be mapped, and that item is left unmapped in later steps.

In step 223, the product classification unit 120 performs lookup operations for the items for which mapping dictionaries have been selected. In the case where the mapping dictionary is stored in the product database unit 135, the lookup involves performing a database query constructed to return the representative item for a particular item. These database queries are performed for each item for each mapping dictionary that has been selected for use with the item. In the cases where the mapping dictionary is a data structure in memory, the lookup operation involves performing a query on the data structure for the representative item for a particular item. For example, the product classification unit 120 performs a lookup operation in the spell checking mapping dictionary for item "Getsby" and receives in response the representative item "Gatsby".

The representative item determined for the lookup operation, found in step 223, is included in the canonical product offering in step 224. The inclusion of the representative item into the canonical product offering is accomplished by the product classification unit 120 by writing the representative item to the data structure for the canonical product offering. For example, the representative item "Gatsby", found in step 223, is written to a data structure, e.g. a string, for the canonical product offering.

In step 225, unmapped items are written to the canonical product offering by the product classification unit 120. Items may be unmapped because no representative item was found in step 223, or no lookup (step 223) was performed for the item or if the item, is in a list of items which should not be mapped (e.g. "the", "a", and "of").

Depending on the data structures implemented, steps 222, 223, 224, and 225 may be performed in a number of ways and may be performed multiple times and in any order. Consider the example of the string "The Great Getsby", having items "The", "Great", and "Getsby" where the canonical product offering will also be in the form of a string. For the first item "The" no mapping dictionary is selected in step 222 and so the unmapped item is written to the canonical product offering in step 225. The next item "Great" has selected a spell checking mapping dictionary (step 222), a lookup operation is performed (step 223), and no mapping is done. The unmapped item "Great" is written to the canonical product offering in step 225. The product classification unit 120 selects a spell checking mapping dictionary and a proper noun dictionary for the third item "Getsby". The spell-checking dictionary returns the representative item "Gatsby" and the proper noun dictionary performs no further mapping. The representative item "Gatsby" is written to the canonical product offering, which now reads "The Great Gatsby".

Once the canonical product offering has been generated, product classification unit 120 finds one or more matching product abstractions for the canonical product offering (step 230). For example, the product classification unit 120 attempts to map the canonical product offering generated in step 220 to one or more product abstractions by using a Bayesian classifier to find the most probable product abstraction matches for the product offering. In general, Bayesian classifiers are, mathematically speaking, a network of interconnected nodes that are trained on known data (product offering data with known mappings to product abstractions) to predict the likelihood that an input product offering is associated with a given output classification. More details about Bayesian classifiers may be found in David D. Lewis. "Naive (Bayes) at forty: The independence assumption in information retrieval". In Claire N'edellec and C'eline Rouveirol, editors, Proceedings of ECML-98, 10th European Conference on Machine Learning, number 1398, pages 4-15, Chemnitz, DE, 1998. Springer Verlag, Heidelberg, DE. Any appropriate algorithm may be used to find matching product abstractions for the canonical product offering, including key word matching, or using an identifier based on one or more of Universal Product Code (UPC), International Standard Book Number (ISBN), manufacturer, manufacturer's part number, and model number. It is also possible that a human operator determines a matching score for each of the canonical product offerings for each of one or more product abstractions the data.

Various examples of the techniques described herein, including the example in FIG. 2 and below in FIG. 3, enable better association of a product offering to a product abstraction by generating a canonical product offering to use in the matching mechanism in place of the product offering. These techniques normalize the product offerings being matched so as to improve the likelihood that product offerings may be successfully mapped to appropriate product abstractions.

Associating a Product Offering with a Product Abstraction

One of the operations of the example described herein is to associate the data obtained by the product offering data gathering unit 110 with product abstractions stored in the product database unit 135.

FIG. 3 is a flow diagram that illustrates a process 300 for associating product offerings with product abstractions. The first step in such a process is making the data available, 305. For example, after a merchant 102A uploads product offering data relating to a product offering for a copy of Fitzgerald's "The Great Getsby" ("Getsby product offering") and that product offering is passed to the product classification unit 120 which, in the steps above, generates the canonical Gatsby product offering from the Getsby product offering and associates the canonical Gatsby product offering with a product abstraction. In alternate embodiments a separate process on the same computer or on a different computer may perform the mapping of product offerings to product abstractions. In those embodiments, the data may be made available to that process over a network, on a machine-readable medium, or any other appropriate communication mechanism and may be in HTML, XML, EDI, character-delimited, or fixed-width formats.

Once the data is made available in step 305, an attempt is made to associate product offering data found in the uploaded data to an existing product abstraction, 320. This process is described in detail above in the context of FIG. 2. For example, the product classification unit 120 processes the product offering made available in step 305, comprising the Getsby product offering, generates a canonical Gatsby product offering, and uses a Bayesian classifier to determine matching scores for multiple product abstractions.

If it is determined in step 330 that no matching abstractions were found, then a decision must be made whether to create a new product abstraction in step 335. For example, if no matching abstraction is found for the canonical Gatsby product offering, the product classification unit 120 makes a decision whether to create a new product abstraction based on, for example, whether other similar product offerings, which also have no matching product abstraction, exist in the system 100. There are numerous other possible factors which may also be considered when deciding whether to create a new product abstraction including the number of similar, extant product abstractions and various characteristics of the merchant—such as knowledge of whether the merchant often creates innovative products which do not correspond to pre-existing abstractions.

Creation of a product abstraction from a product offering may be accomplished in a number of ways. For example, the product classification unit 120 may construct a new product abstraction from an existing product offering by including in the new product abstraction all information from the existing product offering except price, quantity in stock, shipping price, and any merchant-specific information. In another example, the product abstraction may be constructed by picking a similar, sample product abstraction. Then the new product abstraction may be created by replacing the data in the sample product abstraction with corresponding data from the product offering. Consider this simple example: a Tender is the Night product abstraction contains the ISBN and author, Fitzgerald, for the book. When the canonical Gatsby product offering is processed and not mapped to any product abstraction, the product classification unit 120 selects the Tender is the Night product abstraction (since it is also a book and shares the same author) to use as a sample product abstraction. The product classification unit 120 makes a copy of the sample product abstraction and fills in the ISBN and title fields with the ISBN and title from the canonical Gatsby product offering. This sample product abstraction is now complete and is stored in the product database unit 135 as the Gatsby product abstraction.

In another example of creation of a product abstraction from a product offering, a human operator may create a product abstraction based on the product offering by selecting information, from the product offering, to include in the new product abstraction and causing the new product abstraction to be written to the product database unit 135.

If a product abstraction is created as part of step 335 or a matching product abstraction is found in step 330, then the product offering, made available in step 305, is associated with the product abstraction in step 340. For example, the canonical Gatsby product offering is mapped to a "The Great Gatsby" product abstraction that was found in step 320. Alternatively, the canonical Gatsby product offering may be mapped to a The Great Gatsby, First Edition product abstraction created in step 235. It is also possible that a product offering is mapped to multiple product abstractions.

If a new product abstraction is not created in step 335, then the data is flagged for review, step 390. For example, the canonical Gatsby product offering is flagged for review in step 390 by storing the data in the product database unit 135 and writing a reference to that product offering in the product database unit 135 in a table of product offerings that may not be matched to product abstractions. Subsequently, a human operator may review the data in the table of unmapped data in the product database unit 135 and choose to associate the canonical Gatsby product offering with a "The Great Gatsby" product abstraction. The data may be flagged for review by writing the data and/or a reference to the data to a flat file, a database, an LDAP, or any appropriate machine-readable medium. Flagging for review may include sending a rejection report describing the failure to match the product offering to a product abstraction to a party associated with the unmatched product offering.

Once the data is associated with a product abstraction, 340, a decision is made whether to review the mapping 350. In many cases, the mapping of a product offering to a product abstraction will be fairly certain and there will be no need to review the mapping, and the mapping will be confirmed in the database, step 360. In some cases, however, the mapping to a product abstraction will be less certain and will need to be reviewed, step 355. In this embodiment, the method for determining if the mapping needs to be reviewed is to compare the score produced by the Bayesian classifier, which estimates how likely it is that the association of the product offering with the product abstraction is valid, to a predetermined threshold for acceptability. For example, if the canonical Gatsby product offering had a high enough association with a "The Great Gatsby" product offering to be considered a matching product abstraction in step 330, but not high enough to be automatically confirmed in the product database unit 135, then the mapping would be reviewed in step 355.

The review of a mapping in step 355 is performed by a human operator who decides whether to confirm the mapping in the database 360 or flag the data for review 390. Alternatively, this decision may be made automatically based on:

the merchant: certain merchants may have eclectic products for which it is harder to find matching product abstractions and, therefore, would be more likely to have a low matching score between a product offering and a product abstraction;

the product abstraction: certain broader abstractions may have lower thresholds for classification similarity, e.g. "The Great Gatsby" product abstraction may include all editions of the book, whereas a "The Great Gatsby", First Edition product abstraction is narrower;

density of product abstractions: if the product abstraction with which a product offering is being associated is one of many similar product abstractions, then the abstraction may necessitate higher thresholds for classification similarity; or the one or more candidate abstractions found in step 320: if there were multiple candidate product abstractions produced in step 320, then, for example, the product classification unit 120 may decide not to review the mapping and choose to associate the product offering with the broadest of the candidate abstractions. For example, suppose the product classification unit 120 found equivalent matching scores for two product abstractions for the canonical Gatsby product offering: the product classification unit 120 may then choose to map the canonical Gatsby product offering to the Gatsby product abstraction instead of to the narrower "The Great Gatsby", paperback product abstraction.

As a final step for associating product offerings with product abstractions, the mapping is confirmed in the database, 360. For example, the step of confirming the mapping in the product database unit 135 includes adding information describing the mapping of the canonical Gatsby product offering to the Gatsby product abstraction. This information may then be used by the results generation engine 130 to generate results for user queries.

Associating product offerings to product abstractions enables numerous things including enabling a results generation engine 130 to generate result sets based on user queries.

Updating Data in Database

Figure 4:
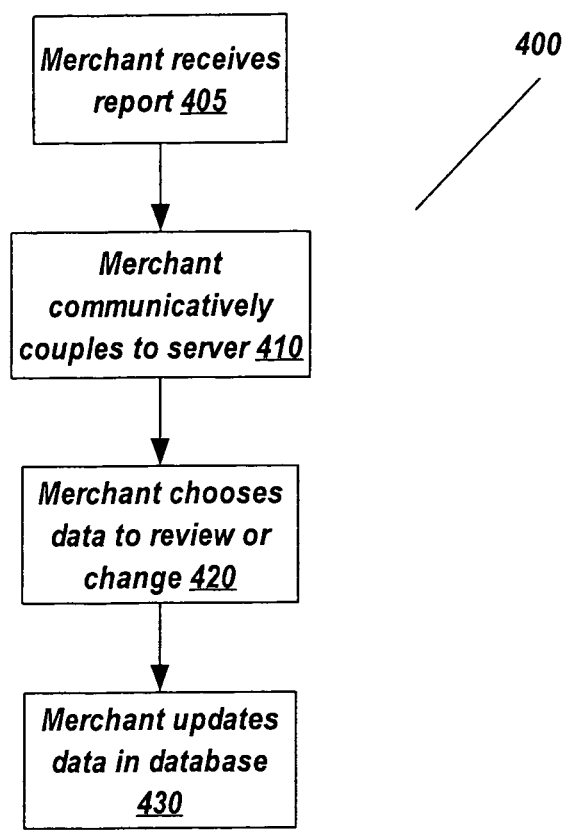
FIG. 4 is a flow diagram that depicts an example process for a merchant to review and update mapping information

In the example herein, merchants may update and change information in the product database unit 135 for their product offerings. FIG. 4 is a flow diagram that depicts a process 400 for a merchant to review and update mapping information, according to one embodiment of the invention.

First, a merchant receives a report, 405. For example, a merchant 102A receives a report via email from the product classification unit 120 that indicates that its canonical Gatsby product offering may be definitively mapped to a product abstraction if the ISBN was provided. The report may be sent in any number of ways, including being displayed to the merchant on a web page when the merchant is logged into a website associated with product classification unit 120, via fax, voicemail, or letter sent to the merchant, or any other appropriate communication mechanism. The reports may include an activity report, a product offering mapping summary report, a data flagging report, or a report to signify what additional data would be needed to map a data set to a product abstraction.

Once the report is received by the merchant in step 405, the merchant communicatively couples to a product classification unit (Step 410). For example, the merchant 102A logs into a website associated with product classification unit 120 using a user name and password. The merchant may also invoke a web service to communicate with the product classification unit 120 or connect to the above-mentioned website using other means such as typing in a URL or providing security credentials.

Once the merchant is logged into the website associated with a product classification unit 120, the merchant chooses what data to review or change, 420. For example, the merchant 102A browses to a web page that enables modification of the choice of product abstraction associated with the canonical Gatsby product offering. Any method for having the merchant specify which data to alter would suffice, e.g. specifying to a web service a parameter value that specifies what data to alter.

Once the data is chosen, the merchant may update the data, 430. For example, the merchant 102A alters the data associated with the canonical Gatsby product offering so that the data includes an ISBN. With that ISBN, the product classification unit 120 will be able to associate the canonical Gatsby product offering with a Gatsby product abstraction. This data may be updated by submitting the change via a website communicatively coupled to the product classification unit 120 or by communicating the change to the product classification unit 120 using a web service or any appropriate network protocol in an appropriate format.

Results Generation

A feature of the embodiment described herein is that results may be generated for a user query based on the mapping information produced by the product classification unit 120. For example, a user 101A submits a query to a website associated with the results generation engine 130 and receives back a set of results.

Figure 5:
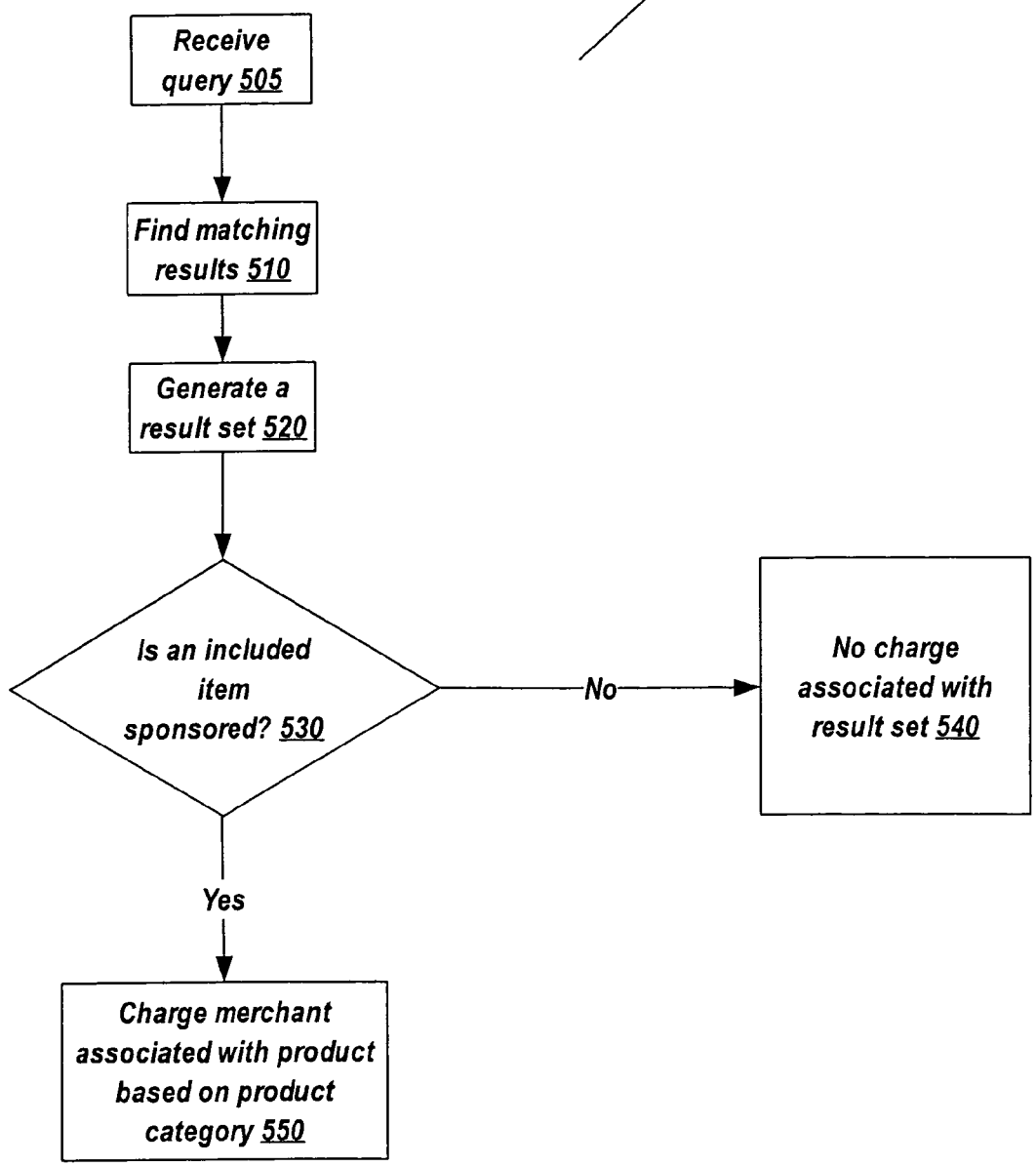
FIG. 5 is a flow diagram that depicts an example process for the generation of results based on a user query.

FIG. 5 is a flow diagram that depicts an example process 500 for the generation of results based on a user query. First, a user query is received, 505. For example, user 101A submits a query to a website associated with the results generation engine 130. The query contains the Boolean phrase "Gatsby AND signed". The query may be submitted to a website in HTML, XML, or any appropriate format. The query may be a Boolean phrase, a keyword search, or any appropriate query format. The query may be submitted via a web service or via FTP, HTTP, HTTPS, rsync, TCP/IP sockets or any appropriate communication protocol.

Queries submitted by users may request a product abstraction comparison grid, a merchant comparison grid, or a product offering comparison grid. A comparison grid displays one or more aspects of one or more items that are displayed on a results page, those items may include merchants, product abstractions, and product offerings. For example a query is received from a user 101A and requests a product offerings comparison grid for copies of the Great Gatsby by Fitzgerald. This comparison grid displays the edition, cost, shipping cost, and condition of the book.

Once the results generation engine 130 receives the query, it finds matching items in step 510. The process of finding matching items may be any appropriate matching algorithm including Bayesian classification and key word matching, and may be for any or all of the different item types: product offering, product abstractions, or merchants. In addition, the matching algorithm may find matching items based, at least in part, on the mapping information that specifies correspondence among multiple items. For example, the results generation engine 130 matches the results generated by a query "Gatsby AND signed" for product offerings from user 101A to match the Gatsby product abstraction and, using the mapping from the Gatsby product abstraction to corresponding product offerings, the results generation engine determines that there are 4 product offerings mapped to the Gatsby product abstraction and displays as results the canonical Gatsby product offering from merchant 102A as well as 3 other offerings to sell unsigned copies of Gatsby from another merchant 102B.

The results generation engine 130 may find matching items based on a particular item. This may be done in a number of ways. For example, a similarity measure among the particular item and candidate results may help determine what is in the result set. For example, a user 101A selects a "find similar product abstractions" query from a web page displaying a laptop with a 1600×1200 screen, where that web page is associated with the results generation engine 130. The results generation engine 130, upon receiving the query, searches for other laptops with 1600×1200 screens and finds two matching product abstractions: one is a laptop with a 1600×1200 screen and a 2.4 GHz processor and the other is a laptop with a 1600×1200 and a 2.5 GHz processor.

Result sets generated in step 520 for a query may include product offerings, product abstractions, links to merchant websites, or any data included in the product database unit 135. One example of a result set is a product abstraction comparison page, which is a page displaying related features of multiple product abstractions together on a single page. For example, a user 101A, communicatively coupled to a website associated with the results generation engine 130, queries for a product comparison page for laptops with 1600×1200 pixel screens. The results generation engine matches the query to a 1600×1200 Laptop product abstraction. The results generation engine 130 produces a HTML product comparison page containing two features, screen size and processor speed, for the two product abstractions for the two laptops: one being a 1600×1200 screen laptop with a 2.4 GHz processor, the other being a 1600×1200 screen laptop with a 2.5 GHz processor. In viewing this page, the user 101A may compare the features of the two laptops side-by-side and see that one has a faster processor than the other. The results sets are usually formatted as a set of HTML or XML hyperlinks in a web page. For example, a set of HTML links to the 4 product offerings for Fitzgerald's Great Gatsby is generated. The result set may also be generated in EDI, character-delimited, or any other appropriate format.

In some types of results sets, e.g. HTML and XML, the references are displayed in a particular order in the result set. The order of display for the list of references in the result set may be determined in any appropriate manner. For example, a function of likelihood that a reference satisfies a query (called "likelihood" here), existence of sponsorship, and cost of sponsorship may be used to determine order. For example, consider a results generation engine 130 that uses the product of likelihood and cost of sponsorship. If two references, reference A, with a likelihood of 75% and a cost of $100, and reference B, with a likelihood of 80% and a cost of $90, then, using the product of likelihood and cost of sponsorship, then reference A (7500) would be listed before reference B (7200).

In order to determine whether to charge the party associated with each item in the result set, it must be determined whether the included item is sponsored, step 530. For example, results generation engine 130 may query the product database unit 135. If an item in the result set is sponsored, then a party associated with the item is charged 550 and that charge is based on the category of product (e.g. books, laptops, etc. . . . ). If the item is not sponsored, then no party is charged for the inclusion of a reference to the item in the result set, 540. For example, merchant 102A will be charged a fee for the inclusion of an HTML link to the merchant's 102A offering of the signed, first edition copy of the Great Gatsby, and no party will be charged a fee for the inclusion of an unsponsored link to sell that copy of the Great Gatsby. The charging of a fee may be done via item-by-item invoicing, charging to a credit card, withdrawing from a debit account, or any appropriate charging mechanism.

Another way to determine how much to charge a party sponsoring an item is to have the result generation engine 130, or a process thereto communicatively coupled, monitor the number of times that references to each sponsored item are selected. In such a case, the search mechanism may determine how much to charge a party sponsoring an item based on the category of the product (e.g. books, laptops, etc.) of the item and based, at least in part, on the number of times that a reference to the item has been selected by a user. For example, a web server associated with the results generation engine 130 monitors the number of times that the users 101A, 101B, 101N select URLs associated with each item in the product database unit 135 and stores this information in the product database unit 135. The amount to charge any particular merchant 102A or 102B would be based on the number of times an item the merchant is sponsoring is selected by any user 101A, 101B, and 101N and based on the item's product category (book, laptop, etc. . . . ).

The process 500 for generating query results for a user enables the generation of result sets and the detection of sponsored and unsponsored items in a results set, which, in turn, enables, among other things, proper system functioning when there is inclusion of sponsored and unsponsored items in result sets. The process 500 also enables charging of a party associated with an item based at least in part on the category to which the product belongs.

Hardware Overview

Figure 6:
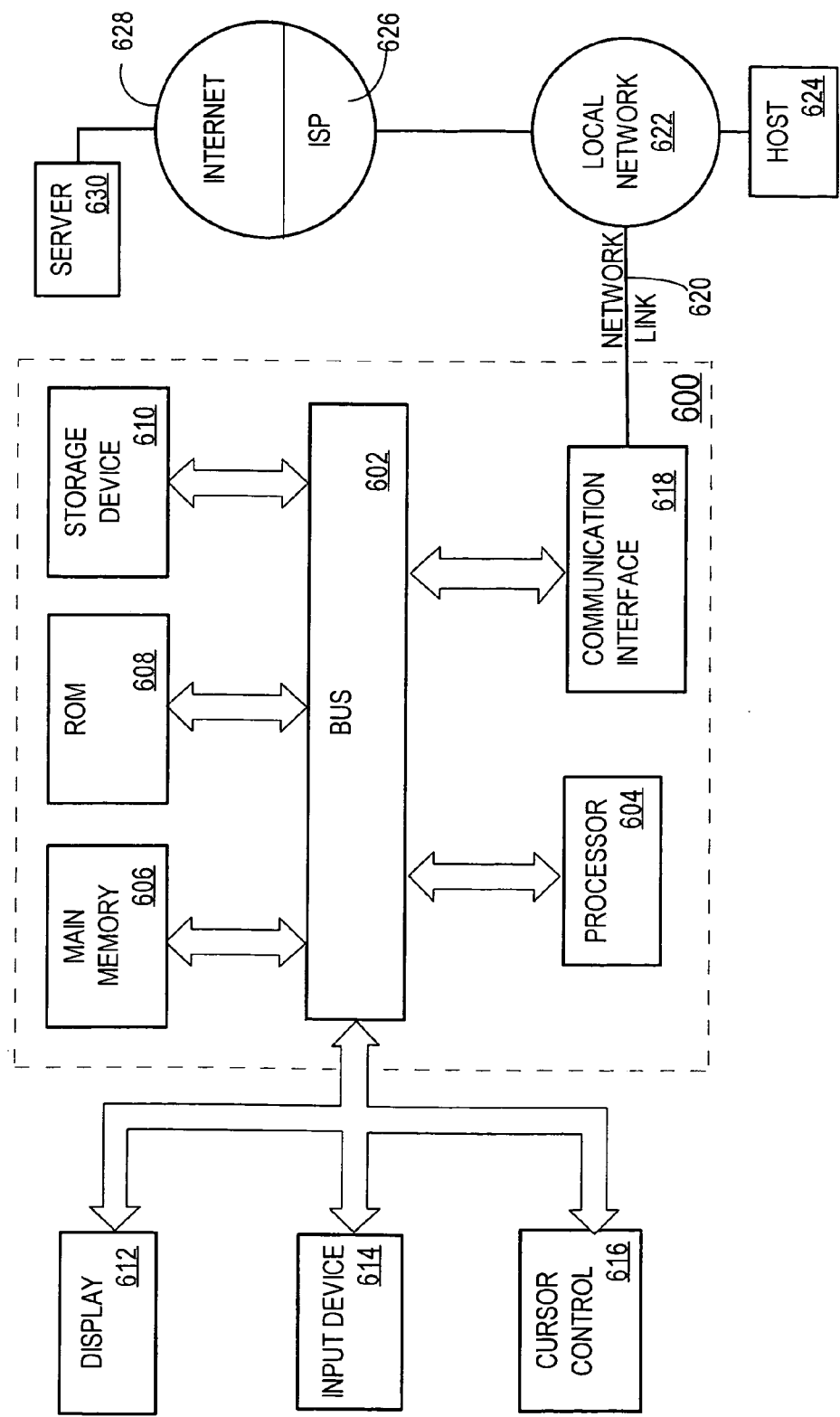
FIG. 6 is a block diagram that illustrates a computer system upon which an embodiment of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infrared data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infrared transmitter to convert the data to an infrared signal. An infrared detector can receive the data carried in the infrared signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 may transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
receiving product offering data describing a plurality of product offerings from a plurality of sources, including a first product offering describing a first source for purchasing a particular product and a second product offering describing a second source for purchasing the particular product;
storing a plurality of product offering records, including a first product offering record storing data describing the first product offering and a second product offering record storing data describing the second product offering;
generating a plurality of product abstraction records based on the product offering data, including a particular product abstraction record for the particular product;
associating product abstraction records in the plurality of product abstraction records with product offering records in the plurality of product offering records, wherein the particular product abstraction record is associated with at least a the first product offering record and the second product offering record;
wherein the first product offering record includes product offering data that describes the particular product using a first set of elements;
wherein the second product offering record includes product offering data that describes the particular product using a second set of elements;
wherein the first set of elements are substantially similar to the second set of elements;
receiving a search request comprising one or more keywords;
searching the plurality of product abstraction records based, at least in part, on the one or more keywords;
based on the searching, identifying a the particular product abstraction record as matching at least a particular keyword of the one or more keywords;
responsive to the search request, based on having identified the particular product abstraction record as matching at least the particular keyword, returning a result that identifies both the first product offering from the first product offering record, and the second product offering from the second product offering record;
wherein the method is performed by one or more computer devices.

2. The method of claim 1, wherein:
the first set of elements describe the first product offering; and
the result identifies the first product offering even though the first set of elements does not include the particular keyword.

3. The method of claim 1, wherein the result comprises data that describes at least one feature in the first product offering that is different than any-feature of the second product offering.

4. The method of claim 1, wherein:
the first set of elements and the second set of elements include a title and an ISBN;
the title in the first set of elements and the title in the second set of elements are different; and
the ISBN in the first set of elements and the ISBN in the second set of elements are the same.

5. The method of claim 1, wherein:
the result also identifies a third product offering from a third product offering record; and
the third product offering record is associated with a second product abstraction record of the plurality of product abstraction records.

6. The method of claim 1, wherein associating product abstraction records with product offering records further comprises:
matching a first element of the first set of elements to a dictionary item in a mapping dictionary; and
comparing the dictionary item to elements of one or more product abstractions of the plurality of product abstractions, including the particular product abstraction.

7. The method of claim 6, wherein the mapping dictionary comprises a mapping of common misspellings of a word to the correctly spelled word.

8. The method of claim 6, further comprising:
determining a matching score by comparing at least one element of the first set of elements with the particular product abstraction record and the dictionary item with the particular product abstraction record;
responsive to the matching score being above a threshold, automatically updating the mapping dictionary to include a new element from the first set of elements.

9. The method of claim 1, further comprising:
generating a comparison grid between the first product offering and the second product offering;
wherein the result further comprises the comparison grid.

10. The method of claim 9, wherein the comparison grid comprises the edition, the cost, the shipping cost, or the condition, of the first product offering and the second product offering.

11. A system comprising:
a database storing a plurality of product offering records, including:
a first product offering record including data describing a first product offering for purchasing a particular product from a first source, and
a second product offering record including data describing a second product offering for purchasing the particular product from a second source;
one or more network interfaces;
one or more processors configured to execute a search engine, wherein the search engine is configured to:
generate a plurality of product abstraction records based on the product offering data, including a particular product abstraction record for the particular product;
associate product abstraction records in the plurality of product abstraction rocords with product offering records in the plurality of product offering records, wherein the particular product abstraction record is associated with at least the first product offering record and the second product offering record;
wherein the first product offering record includes product offering data that describes the particular product using a first set of elements;
wherein the second product offering record includes product offering data that describes the particular product using a second set of elements;
wherein the first set of elements are substantially similar to the second set of elements;
store the associations in the database;
receive a search request comprising one or more keywords through the one or more network interfaces;
search the plurality of product abstraction records based, at least in part, on the one or more keywords;
based on the searching identify the particular product abstraction record as matching at least a particular keyword of the one or more keywords;
responsive to the search request, based on having identified the particular product abstraction record as matching at least the particular keyword, return through the one or more network interfaces a result that identifies both the first product offering from the first product offering record, and the second product offering from the second product offering record.

12. The system of claim 11, wherein:
the first set of elements describe the first product offering; and
the result identifies the first product offering even though the first set of elements does not include the particular keyword.

13. The system of claim 11, wherein the result comprises data that describes at least one feature in the first product offering that is different than the second product offering.

14. The system of claim 11, wherein:
the first set of elements and
the second set of elements include a title and an ISBN;
the title in the first set of elements and the title in the second set of elements are different;
the ISBN in the first set of elements and the ISBN in the second set of elements are the same.

15. The system of claim 11, wherein:
the result also identifies a third product offering from a third product offering record; and
the third product offering record is associated with a second product abstraction record of the plurality of product abstraction records.

16. The system of claim 11, wherein search engine is further configured to:
match a first element of the first set of elements to a dictionary item in a mapping dictionary; and
compare the dictionary item to elements of one or more product abstractions of the plurality of product abstractions, including the particular product abstraction.

17. The system of claim 16, wherein the mapping dictionary comprises a mapping of common misspellings of a word to the correctly spelled word.

18. The system of claim 16, wherein the search engine is further configured to:
determine a matching score by comparing at least one element of the first set of elements with the particular product abstraction record and the dictionary item with the particular product abstraction record;
responsive to the matching score being above a threshold, automatically update the mapping dictionary to include a new element from the first set of elements.

19. The system of claim 11, wherein the search engine is further configured to:
generate a comparison grid between the first product offering and the second product offering;
wherein the result further comprises the comparison grid.

20. The system of claim 19, wherein the comparison grid comprises the edition, the cost, the shipping cost, or the condition, of the first product offering and the second product offering.

21. One or more non-transitory computer-readable medium storing instructions which, when executed by one or more processors, cause performance of a method comprising:
receiving product offering data describing a plurality of product offerings from a plurality of sources, including a first product offering describing a first source for purchasing a particular product and a second product offering describing a second source for purchasing the particular product;
storing a plurality of product offering records, including a first product offering record storing data describing the first product offering and a second product offering record storing data describing the second product offering;
generating a plurality of product abstraction records based on the product offering data, including a particular product abstraction record for the particular product;
associating product abstraction records in the plurality of product abstraction records with product offering records in the plurality of product offering records, wherein the particular product abstraction record is associated with at least the first product offering record and the second product offering record;
wherein the first product offering record includes product offering data that describes the particular product using a first set of elements;
wherein the second product offering record includes product offering data that describes the particular product using a second set of elements;
wherein the first set of elements are substantially similar to the second set of elements;

receiving a search request comprising one or more keywords;

searching the plurality of product abstraction records based, at least in part, on the one or more keywords;

based on the searching, identifying the particular product abstraction record as matching at least a particular keyword of the one or more keywords;

responsive to the search request, based on having identified the particular product abstraction record as matching at least the particular keyword, returning a result that identifies both the first product offering from the first product offering record, and the second product offering from the second product offering record.

22. The one or more non-transitory computer-readable medium of claim 21, wherein:

the first set of elements describe the first product offering; and the result identifies the first product offering even though the first set of elements does not include the particular keyword.

23. The one or more non-transitory computer-readable medium of claim 21, wherein the result comprises data that describes at least one feature in the first product offering that is different than the second product offering.

24. The one or more non-transitory computer-readable medium of claim 21, wherein:

the first set of elements and the second set of elements include a title and an ISBN;

the title in the first set of elements and the title in the second set of elements are different; and the ISBN in the first set of elements and the ISBN in the second set of elements are the same.

25. The one or more non-transitory computer-readable medium of claim 21, wherein:

the result also identifies a third product offering from a third product offering record; and the third product offering record is associated with a second product abstraction record of the plurality of product abstraction records.

26. The method of claim 1, wherein associating product abstraction records with product offering records further comprises:

matching a first element of the first set of elements to a dictionary item in a mapping dictionary; and comparing the dictionary item to elements of one or more product abstractions of the plurality of product abstractions, including the particular product abstraction.

27. The one or more non-transitory computer-readable medium of claim 26, wherein the mapping dictionary comprises a mapping of common misspellings of a word to the correctly spelled word.

28. The method of claim 6, further comprising:

determining a matching score by comparing at least one element of the first set of elements with the particular product abstraction record and the dictionary item with the particular product abstraction record;

responsive to the matching score being above a threshold, automatically updating the mapping dictionary to include a new element from the first set of elements.

29. The one or more non-transitory computer-readable medium of claim 21, wherein the method further comprising:

generating a comparison grid between the first product offering and the second product offering;

wherein the result further comprises the comparison grid.

30. The one or more non-transitory computer-readable medium of claim 29, wherein the comparison grid comprises the edition, the cost, the shipping cost, or the condition, of the first product offering and the second product offering.

* * * * *